(12) United States Patent
Christopher et al.

(10) Patent No.: US 6,637,817 B1
(45) Date of Patent: Oct. 28, 2003

(54) UNITARY ADJUSTABLE SEAT BASKET

(75) Inventors: Cosentino Christopher, Bolton (CA);
Tony Maier, Aurora (CA); Jack Rietveld, Burlington (CA); Igor Demin, Windsor (CA)

(73) Assignee: Schukra of North America, Ltd., Ontario (CA)

( * ) Notice: Subject to any disclaimer, the term of this patent is extended or adjusted under 35 U.S.C. 154(b) by 0 days.

(21) Appl. No.: 09/540,553

(22) Filed: Mar. 31, 2000

(30) Foreign Application Priority Data

Apr. 8, 1999 (CA) .............................................. 2268481

(51) Int. Cl.[7] .............................................. A47C 3/025
(52) U.S. Cl. .................................................. 297/284.4
(58) Field of Search .......................... 297/284.4, 284.1, 297/284.8, 284.7

(56) References Cited

U.S. PATENT DOCUMENTS

| 1,743,377 | A | 1/1930 | Nadell | |
|---|---|---|---|---|
| 3,378,299 | A | 4/1968 | Sandor | 297/284 |
| 3,762,769 | A | 10/1973 | Poschl | 297/284 |
| 4,153,293 | A | 5/1979 | Sheldon | 297/284 |
| 4,313,637 | A | 2/1982 | Barley | 297/284 |
| 4,316,631 | A | 2/1982 | Lenz et al. | 297/284 |
| 4,354,709 | A | 10/1982 | Schuster | 297/284 |
| 4,359,245 | A | 11/1982 | Franke | 297/284 |
| 4,601,514 | A | 7/1986 | Meiller | 297/284 |
| 4,627,661 | A | 12/1986 | Ronnhult et al. | 297/284 |
| 4,632,454 | A | 12/1986 | Naert | 297/284 |
| 4,650,247 | A | 3/1987 | Berg et al. | 297/284 |
| 4,676,550 | A | 6/1987 | Neve De Mevergnies | 297/284 |
| 4,880,271 | A | 11/1989 | Graves | 257/284 |
| 4,909,568 | A | 3/1990 | Dal Monte | 297/284 |
| 4,968,093 | A | 11/1990 | Dal Monte | 297/284 |
| 5,026,116 | A | 6/1991 | Dal Monte | 297/284 |
| 5,050,930 | A | 9/1991 | Schuster et al. | 257/284 |
| 5,197,780 | A | 3/1993 | Coughlin | 297/284.7 |
| 5,217,278 | A | 6/1993 | Harrison et al. | 297/284 |
| 5,335,965 | A | 8/1994 | Sessini | 297/284 |
| 5,385,531 | A | 1/1995 | Jover | 601/99 |
| 5,397,164 | A | 3/1995 | Schuster et al. | 297/284 |
| 5,518,294 | A | 5/1996 | Ligon, Sr. et al. | 297/284 |
| 5,553,917 | A | 9/1996 | Adat et al. | 297/230.14 |
| 5,626,390 | A | 5/1997 | Schuster et al. | 297/284 |
| 5,762,397 | A | 6/1998 | Venuto et al. | 297/284 |
| 5,775,773 | A | 7/1998 | Schuster et al. | 297/284.1 |
| 6,007,151 | A | * 12/1999 | Benson | |
| 6,139,102 | A | * 10/2000 | von Moller | |

FOREIGN PATENT DOCUMENTS

| CA | 2181776 | 1/1998 | |
|---|---|---|---|
| DE | 2040794 | 8/1970 | 297/284.4 |
| DE | 2345254 | 4/1974 | |
| DE | DT 2804-703 | 8/1979 | 297/284.4 |
| EP | 0 322 535 A1 | 10/1988 | |
| GB | 2013487 | 8/1979 | A47C/7/46 |
| SU | 0587924 | 1/1978 | 297/284.4 |

* cited by examiner

Primary Examiner—Milton Nelson, Jr.
(74) Attorney, Agent, or Firm—Grant D. Kang, Esq.; Robert C. Haldiman, Esq.; Husch & Eppenberger, LLC (57) ABSTRACT

An adjustable seat basket for providing lumbar support mountable on a seat back has mounting tabs, hinges adjacent the mounting tabs, a basket adjacent the hinge, and pivoting tabs for attaching an adjustment mechanism, all of a unitary construction of a resilient material, preferably spring steel. The hinge is a living hinge formed by bending the resilient material between the mounting tabs and the basket in a gentle curve. The basket is trapezoidal when in a flat position and viewed from the side.

20 Claims, 6 Drawing Sheets

PRIOR ART

UNITARY ADJUSTABLE SEAT BASKET

FIELD OF THE INVENTION

This invention relates to an adjustable seat basket for providing lumbar support.

BACKGROUND OF THE INVENTION

Adjustable seat baskets, located in a seat back, are used to provide controllably varying amounts of lumbar support to a person sitting in the seat. The primary components of existing adjustable seat baskets are a basket assembly, a hinge assembly and an adjustment mechanism.

The hinge assembly is attached to the seat back and a first end of the basket assembly. It fixes the basket assembly to the backrest while allowing the basket assembly to pivot relative to the seat back. The second end of the basket assembly bears on the seat back but is not fixed to the seat back, other than being generally held in place by the seat upholstery. Thus the second end of the basket assembly is free to both pivot relative to the seat back and to move up or down the seat back and relative to the first end of the basket assembly. The adjustment mechanism reversably draws the first and second ends of the basket together causing the basket assembly to curve and extend outward from the backrest to provide lumbar support.

Such adjustable seat baskets are complicated to manufacture and assemble. The basket frame and adjustment mechanism often comprise several parts. The hinge assembly comprises three additional parts; a hinge bracket (connected to the seat back), a hinge pin, and a lock plate (connected to the basket assembly). Further, the hinge requires lubrication and can wholly or partially seize and interfere with the smooth motion of the adjustable seat basket.

SUMMARY OF THE INVENTION

The present invention is directed at an improved adjustable seat basket that is simple and inexpensive to manufacture and avoids friction wearing surfaces.

In one aspect, the invention provides an adjustable seat basket mountable on a seat back comprising a unitary structure of resilient material having:
 (a) a mounting tab;
 (b) a living hinge adjacent the mounting tab; and,
 (c) a basket having a proximal side adjacent the living hinge and a distal side relative to the living hinge.

The resilient material is spring steel preferably between 0.5 mm and 0.65 mm thick. The living hinge is preferably narrower than the basket and has a radius between 8 and 12 mm. The basket has at least one pivoting tab which is part of the unitary construction for attaching an adjustment mechanism near at least one of the proximal side of the basket and the distal side of the basket. The adjustable seat basket also has a curved surface which is part of the unitary construction adjacent to the distal side of the basket, the curved surface slidably engageable with the seat back.

The adjustable seat basket has an adjustment mechanism attached to it at a proximal point near the living hinge and at a distal point near the distal side of the basket and which is operable to releasably shorten the straight line distance between the proximal point and distal point. Preferably, the adjustment mechanism, when operated to allow the maximum straight line distance between the proximal point and distal point, exerts a residual tensile force on the adjustable seat basket between the proximal point and distal point such that the basket remains slightly curved.

In another aspect, the invention provides an adjustable seat basket mountable on a seat back comprising:
 (a) a mounting tab;
 (b) a hinge adjacent to the mounting tab;
 (c) a first extending surface having a first end and a second end, the first end adjacent to the hinge and the second end extending away from the seat back;
 (d) a basket surface having a first edge and a second edge, the first edge adjacent to the second end of the first extending surface; and,
 (e) a second extending surface having a first side and a second side, the first side adjacent to the second edge of the basket surface and the second side extending towards the seat back
  wherein the adjustable seat basket is a unitary construction of a resilient material and the hinge is a living hinge.

The resilient material is spring steel preferably between 0.5 mm and 0.65 mm thick. The living hinge is preferably narrower than the basket and has a radius between 8 and 12 mm. The basket surface has at least one pivoting tab which is part of the unitary construction for attaching an adjustment mechanism near at least one of the first edge and second edge. There is also a curved surface which is part of the unitary construction adjacent to the second side of the second extending surface, the curved surface slidably engageable with the seat back.

The adjustable seat basket has an adjustment mechanism attached to the adjustable seat basket at a proximal point near the living hinge and at a distal point near the second edge of the basket surface or the second extending surface which is operable to releasably shorten the straight line distance between the proximal point and distal point. Preferably, the adjustment mechanism, when operated to allow the maximum straight line distance between the proximal point and distal point, exerts a residual tensile force on the adjustable seat basket between the proximal point and distal point such that the basket surface remains slightly curved.

The adjustable seat basket has darts in the resilient material between the basket surface and the first extending surface and second extending surface. The basket surface and the living hinge are more easily bendable than the resilient material between the basket surface and the first extending surface and second extending surface.

The interior angles between the basket surface and the first extending surface and between the basket surface and the second extending surface are each between 90 degrees and 135 degrees. Preferably, the length and interior angle relative to the basket surface of the first extending surface and second extending surface are similar. The adjustable seat basket is generally trapezoidal, the basket surface being at the top of the trapezoid, when viewed from the side in a flat position.

BRIEF DESCRIPTION OF THE DRAWINGS

An existing adjustable seat basket and embodiments of the present invention will be described below with reference to the following figures.

DETAILED DESCRIPTION OF THE INVENTION

Figure 1:
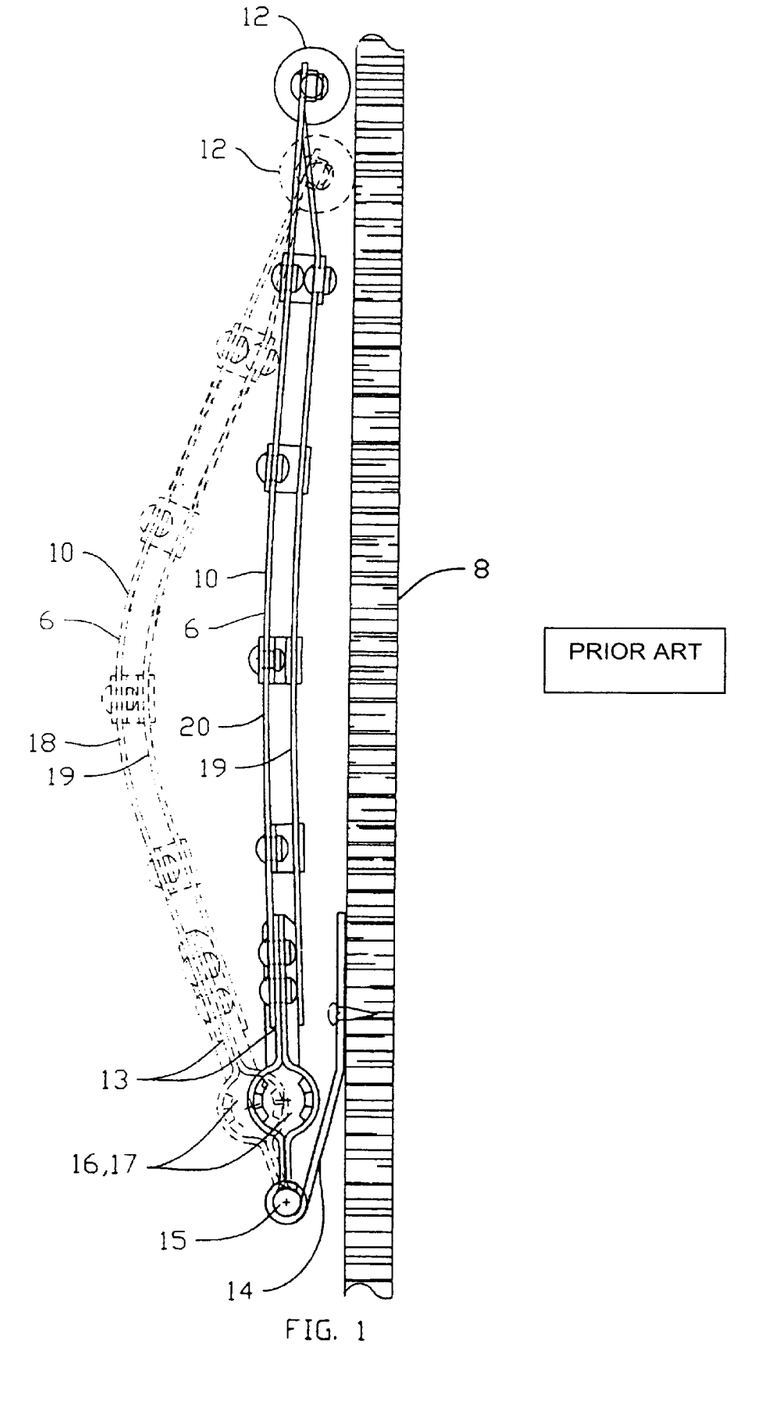
FIG. 1 is a side view of an existing adjustable seat basket shown in a curved position in and in a flat position.

An existing adjustable seat basket 6 is shown in FIG. 1 attached to a seat back 8. Its primary components are (a) a basket assembly 10, (b) a roller bar 12, (c) a lock plate 13, (d) a hinge bracket 14, (d) a hinge pin 15 and (e) an adjustment mechanism 16.

Still referring to FIG. 1, the adjustable seat basket 6 is shown in an arched position 18 and a non-arched position 20. The adjustable seat basket 6 is moved between these positions by operating the adjustment mechanism 16. The adjustment mechanism 16 has a worm 17 connected to a helical gear (not visible) inside of the lock plate 13 which applies a tensile force to a lower bar 19 of the basket assembly 10. As tensile force is applied to the lower bar 19, the basket assembly 10 arches away from the seat back 8 to provide increased lumbar support. Simultaneously, the basket assembly 10 pivots on the hinge pin 15 and roller bar 12 and the roller bar 12 moves towards the hinge pin 15. No bending occurs in the hinge bracket 14 and lock plate 13 which are typically made of cold rolled steel in sufficient thickness to be rigid compared to the basket assembly 10.

Figure 2:
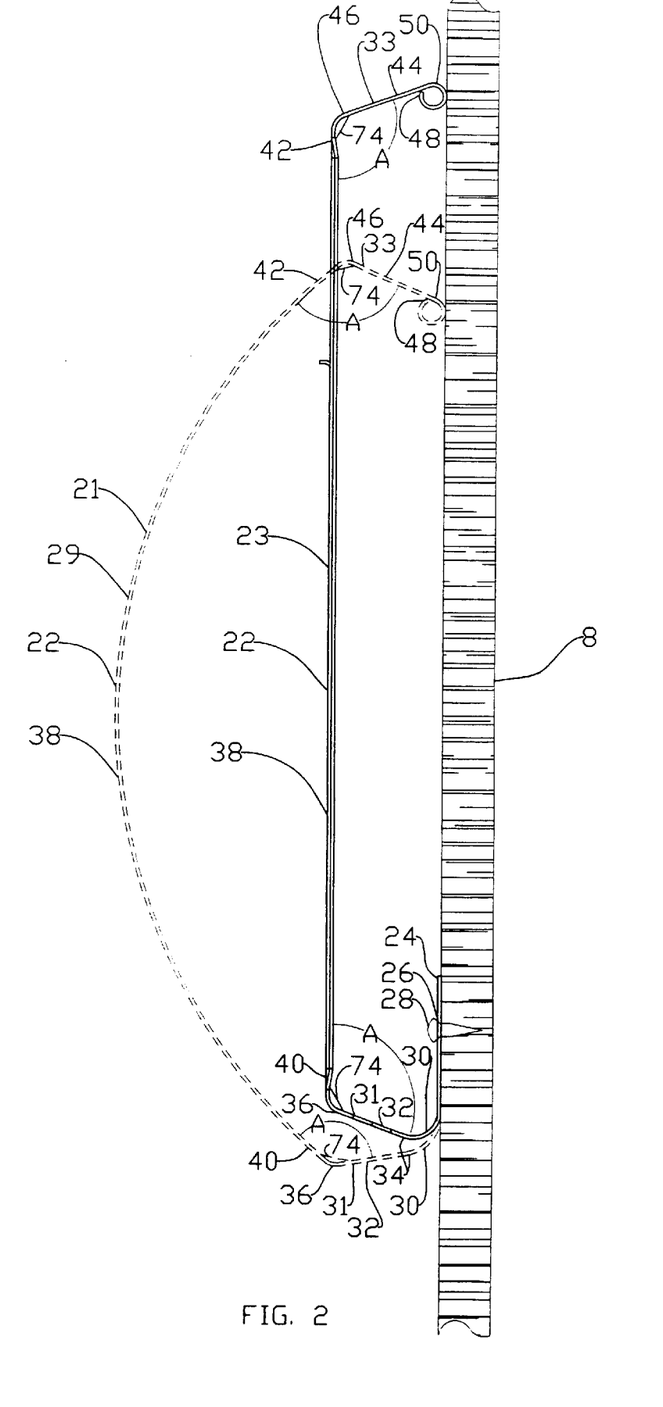
FIG. 2 is a side view of an embodiment of the current invention shown in a curved position and in a flat position and with the adjustment mechanism removed.
Figure 3:
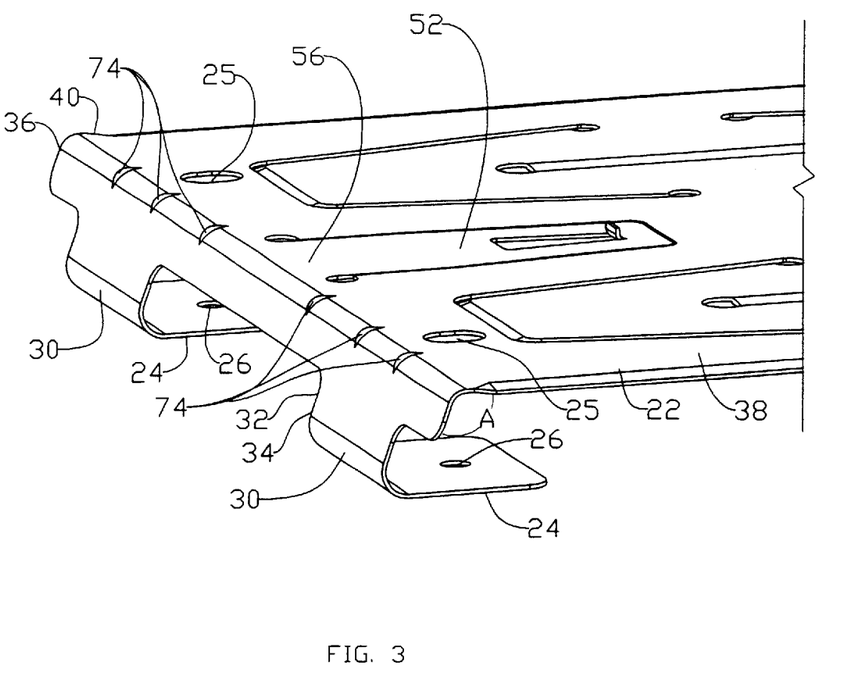
FIG. 3 is a perspective view of one end of an embodiment of the current invention.

Referring now to FIGS. 2 and 3, a seat basket 22 according to an embodiment of the invention is shown. The seat basket 22 is made of a unitary structure made of a resilient material. The resilient material must be capable of sufficient deformation without losing its resilience in a thickness that is sufficient to withstand the force applied by a person pressing against the seat basket 22. The resilient material is preferably spring steel and more preferably Martinsite in a sheet between 0.5 mm and 0.65 mm in thickness. The resilient material can be cut and bent using known methods to produce the shapes shown in the Figures and described below. Referring to FIG. 2, the seat basket 22 is shown in both a curved position 21 and a flat position 23.

Referring again to FIGS. 2 and 3, the seat basket 22 has mounting tabs 24 with holes 26 to receive fasteners 28, such as a screw, rivet, or bolt, for mounting the mounting tabs 24, and thus the seat basket 22, to a seat back 8. As shown in FIG. 3, access holes 25 allow a tool to access the fasteners 28 through the seat basket 22.

A living hinge 30 is formed adjacent to the mounting tab and preferably has a radius between 8 mm and 12 mm. This radius is needed to prevent the living hinge 30 from being permanently deformed, or set, during normal flexing of the seat basket 22 between the curved position 21 and the flat position 23. The living hinge 30 is further preferably substantially adjacent the seat back 8.

As best seen in FIG. 3, part of the width of the seat basket 22 is removed in the area of the living hinge 30 such that the living hinge 30 is narrower than the remainder of the seat basket 22. Preferably, there are a plurality of sections of the living hinge 30 and, more preferably, the living hinge 30 has two sections each between 20 mm and 40 mm wide. The reduced width of the living hinge 30 provides sufficient support for the seat basket 22 while reducing the force needed to bend it.

Still referring to FIGS. 2 and 3, a basket 29 has a proximal side 31 adjacent the living hinge 30 and a distal side 33 relative to the living hinge 30. The basket 29 further has a first extending surface 32, a basket surface 38 and a second extending surface 44. The first extending surface 32 has a first end 34 adjacent to the living hinge 30 and a second end 36 extending away from the seat back 8. The basket surface 38 has a first edge 40 adjacent to the second end 36 of the first extending surface 32 and a second edge 42. The second extending surface 44 has a first side 46 adjacent to the second edge 42 of the basket surface 38 and a second side 48 extending towards the seat back 8. A curved surface 50, preferably made of a cylinder rolled in the sheet material, is adjacent to the second side 48 of the second extending surface 44 or the distal side of the basket and is part of the same unitary construction. The curved surface 50 slidably engages the seat back 8.

Figure 4:
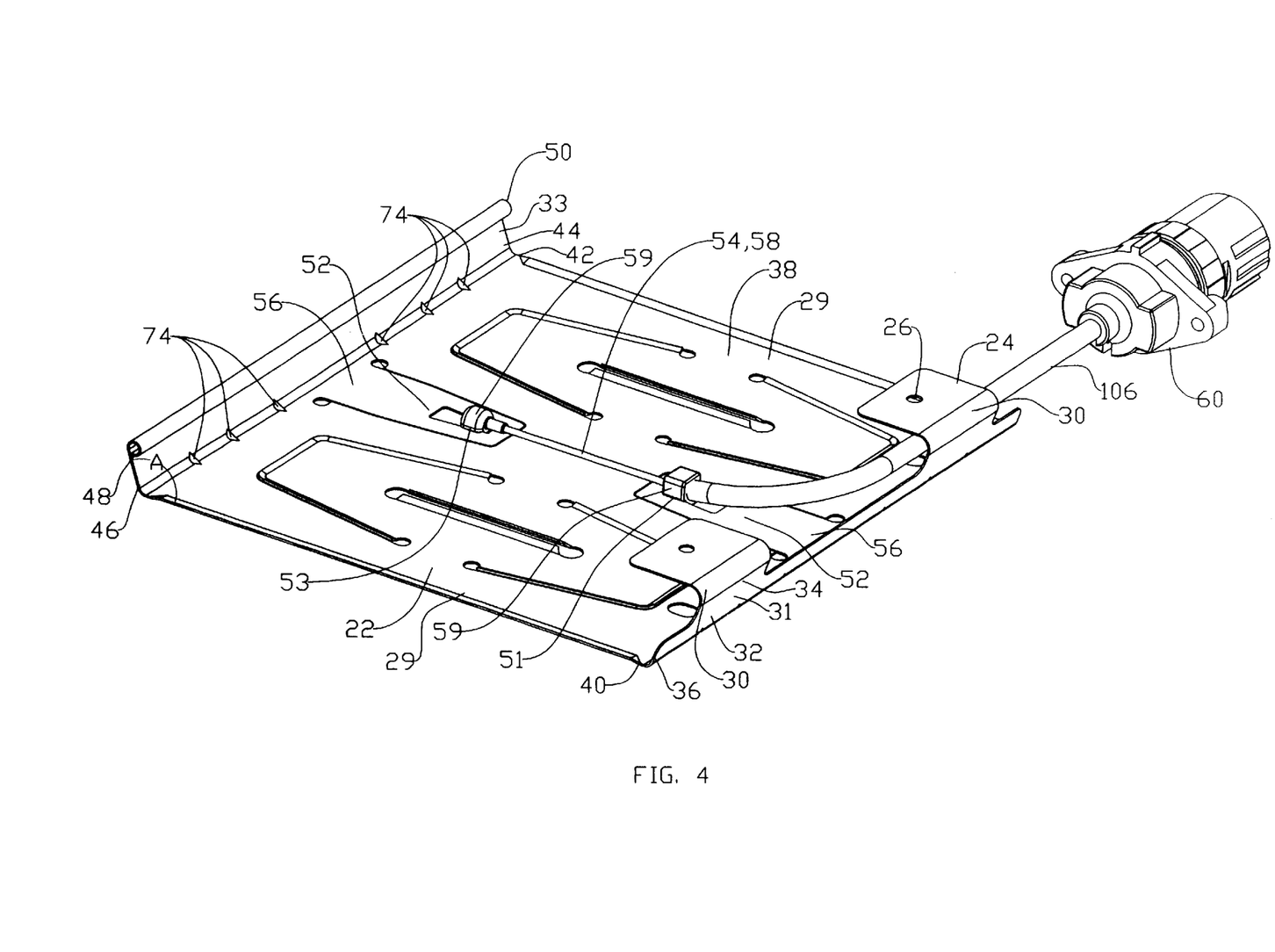
FIG. 4 is a perspective view of a cable adjustment mechanism attached to an embodiment of the current invention.

Referring now to FIG. 4, the basket surface 38 also has two opposed pivoting tabs 52 for attaching an adjusting mechanism 54 at a proximal point 51 near the living hinge 30 and a distal point 53 near the distal side 33 of the basket 29. The adjusting mechanism is operable to releasably shorten the straight line distance between the proximal point 51 and the distal point 53. Preferably, the adjustment mechanism 54, when operated to allow the maximum straight line distance between the proximal point 51 and the distal point 53, exerts a residual tensile force on the seat basket 22 between the proximal point 51 and distal point 53 such that the seat basket 22 remains slightly curved. The use of the two opposed pivoting tabs 52 allows the cable 106 to exit from the side of the seat basket 22 so that the seat basket 22 may be mounted lower on the seat back 8.

The pivoting tabs 52 are preferably of the same unitary construction as the rest of the seat basket 22 and made by cutting the basket surface 38 around the perimeter of the pivoting tabs 52 but for the distal edges 56 of the pivoting tabs 52. Thus the distal edges 56 act like a living hinge allowing the pivoting tabs 52 to pivot. Shortening the distance between the pivoting tabs 52 causes the basket surface 38 to curve and extend away from the seat back 8 to provide lumbar support.

Many types of adjusting devices may be used for the adjusting mechanism 54. The adjusting mechanism 54 shown in FIG. 4 is a cable assembly 58 connected by cable connectors 59 to the pivoting tabs 52. An actuator and gear assembly 60 are operable to shorten or lengthen the length of the cable assembly 58 between the pivoting tabs 52.

Figure 5:
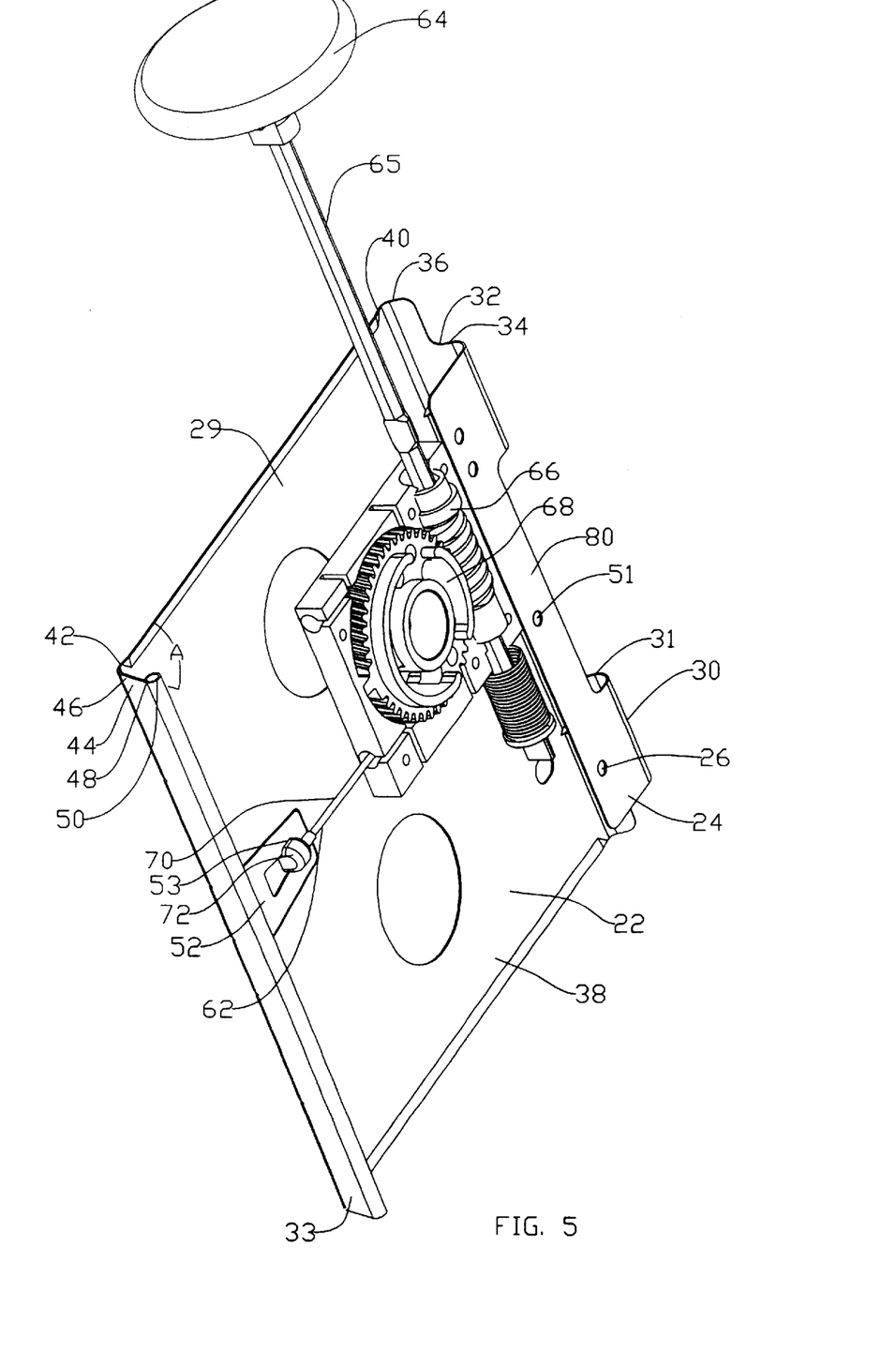
FIG. 5 is a perspective view of a shaft adjustment mechanism attached to an embodiment of the current invention.

A second adjusting mechanism 62 is shown in FIG. 5. This adjusting linkage uses a handle 64 with a shaft 65 attached to a worm 66 to rotate a helical gear 68 mounted to the seat basket 22 at a proximal point 51 near the living hinge 30 and preferably to an alternative mounting tab 80. A rod or cable 70 is attached to the helical gear 68 and to a cable connector 72 on a pivoting tab 52 at a distal point 53 near the distal side 33 of the basket 29. Operating the handle 64 causes the distance between the proximal point 51 and distal point 53 to lengthen or shorten. With at least one of the proximal point 51 and distal point 53 located away from the basket surface 38, the force on the second adjusting mechanism 62 required to bend the basket surface 38 is reduced because of increased leverage.

As best shown in FIG. 2, the first extending surface 32 and second extending surface 44 locate the basket surface 38 away from the seat back 8 which creates space for the adjusting mechanism 54 or alternate adjusting mechanism 62.

When the adjusting mechanism 54 or second adjusting mechanism 62 are operated to release tension between the pivoting tabs 52, the seat basket 22 is in the flat position 23 wherein the basket surface 38 is preferably substantially parallel to the seat back 8, but for the slight curve referred to above. Because of an interior angle A between the basket surface 38 and the first extending surface 32 (the interior angle is preferably between 90 degrees and 135 degrees), however, the living hinge 30 is only required to bend through an angle between 90 degrees and 135 degrees. This avoids having a living hinge 30 which is substantially bent over onto itself which might deform under the load of a person pushing into the basket surface 38.

As best shown in FIG. 2, the interior angles A relative to the basket surface 38 of the first extending surface 32 and second extending surface 44 are both preferably between 90 degrees and 135 degrees. Thus, when the basket surface 38 curves, the first extending surface 32 and second extending surface 44 first become more perpendicular to the seat back 8 and may take on a reversed angle relative to the seat back 8 as maximum deflection of the basket surface 38 is reached. Thus, the angles between the first extending surface 32 and second extending surface 44 and the seat back 8 are more often nearly perpendicular which reduces the magnitude of unintentional moments created on the first edge 40 and second edge 42 of the basket surface 38 by the first extending surface 32 and second extending surface 44 as they resist the force of a person pushing the basket surface 38 towards the seat back 8. Preferably, the first extending surface 32 and second extending surface 44 are perpendicular to the seat back 8 when the basket surface 38 is near midway between the curved position 21 and the flat position 23.

Still referring to FIG. 2, the length and interior angles A relative to the basket surface 38 of the first extending surface 32 and second extending surface 44 are also preferably similar. Thus, the adjustable seat basket 22 is substantially trapezoidal, the basket surface 38 being at the top of the trapezoid, when viewed from the side in the flat position 23. When the basket surface 38 curves, the first extending surface 32 and second extending surface 44 move in similar, but mirror image, paths. This makes the first edge 40 and second edge 42 of the basket surface 38 move towards or away from the seat back 8 by similar amounts and avoids creating unintentional tilting of the basket surface 38 relative to the seat back 8.

To better resist moments created on the first edge 40 and second edge 42 of the basket surface 38 by the first extending surface 32 and second extending surface 44, darts 74 are formed in the resilient material between the basket surface 38 and the first extending surface 32 and second extending surface 44 are indented. The darts 74 are best shown in FIG. 3 and consist of angled depressions made in the sheet material. As shown in FIG. 2, the darts 74 provide more depth to the resilient material between the basket surface 38 and the first extending surface 32 and second extending surface 44. This increases the rotational strength of the resilient material in these areas and inhibit these areas from acting as living hinges. The darts 74, coupled with the reduced width of the living hinge 30 relative to the basket 29, encourages pivoting at the living hinge 30 over deformation of the basket 29.

Figure 6:
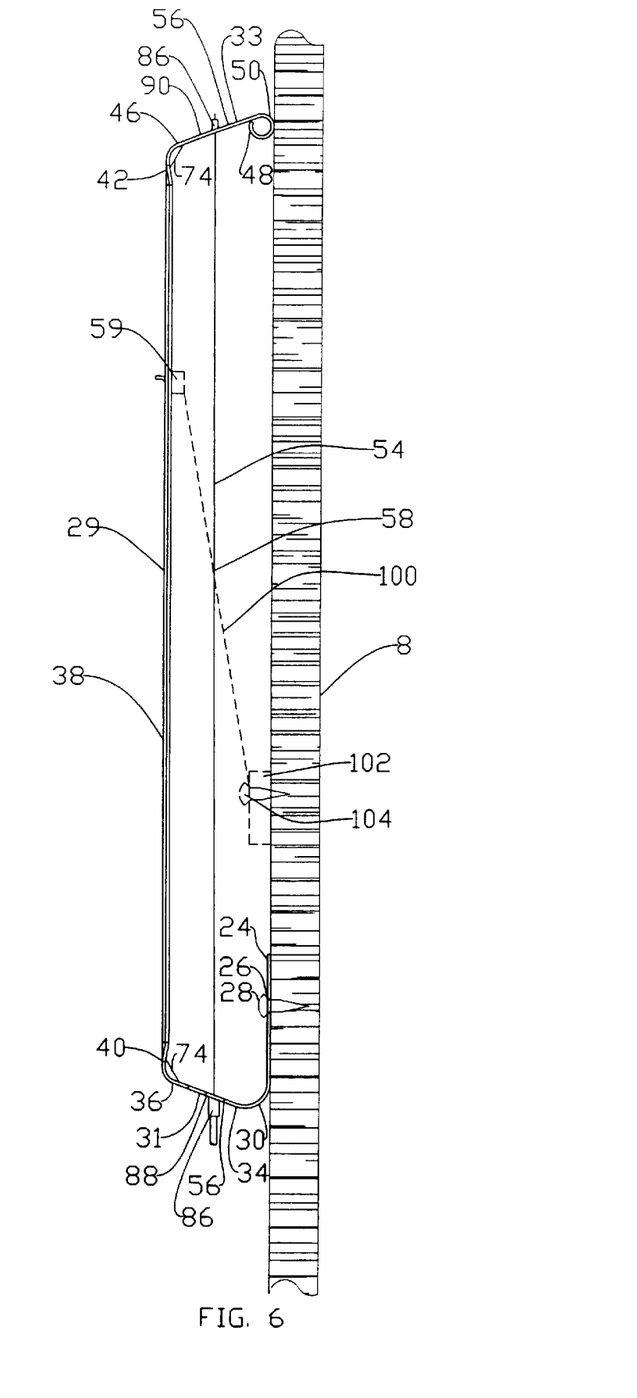
FIG. 6 is a side view of alternate embodiments of the current invention.

In an alternate embodiment shown in FIG. 6, the adjusting mechanism 54 has attachments 86 abutting an alternative first extending surface 88 and an alternative second extending surface 90. In a second alternate embodiment shown in dashed lines in FIG. 6, a second alternate adjustment mechanism 100 has a seat back connector 102 for attaching the second alternate adjustment mechanism 100 to the seat back 8. For example, the seat back connector 102 may be a screw 104 passing through the centre of the helical gear 68 and into the seat back 8.

It is to be understood that what has been described is a preferred embodiment to the invention. If the invention nonetheless is susceptible to certain changes and alternative embodiments fully comprehended by the spirit of the invention as described above, and the scope of the claims set out below.

We claim:

1. An adjustable seat basket adapted to mount on a seat back comprising:
   (a) a mounting tab;
   (b) a hinge adjacent to said mounting tab;
   (c) a first extending surface having a first end and a second end, said first end adjacent to said hinge and said second end being adapted to extend away from the seat back;
   (d) a basket surface having a first edge and a second edge, said first edge adjacent to said second end of said first extending surface adjacent to said second end of said first extending surface; and,
   (e) a second extending surface having a first side and a second side, said first side adjacent to said second edge of said basket surface and said second side being adapted to extending towards the seat back;
   wherein said adjustable seat basket is a unitary construction of a resilient material and said hinge is a living hinge.

2. The invention of claim 1 wherein the resilient material is spring steel.

3. The invention of claim 2 wherein the spring steel is between 0.5 mm and 0.65 mm thick.

4. The invention of claim 1 wherein said living hinge is narrower than said basket is wide.

5. The invention of claim 4 wherein the living hinge has a radius between 8 and 12 mm.

6. The invention of claim 1 wherein the basket surface has at least one pivoting tab which is part of the unitary construction for attaching an adjustment mechanism near at least one of the first edge and second edge.

7. The invention of claim 6 wherein the basket surface has two spaced apart pivoting tabs which are part of the unitary construction for attaching an adjustment mechanism, one near the first edge and one near the second edge.

8. The invention of claim 6 having a curved surface which is part of the unitary construction adjacent to the second side of the second extending surface, the curved surface slidably engageable with the seat back.

9. The invention of claim 1 wherein the adjustable seat basket has an adjustment mechanism attached to the adjustable seat basket at a proximal point near the living hinge and at a distal point near the second edge of the basket surface or the second extending surface and the adjustment mechanism is operable to releasably shorten the straight line distance between the proximal point and distal point.

10. The invention of claim 9 wherein the adjustment mechanism, when operated to allow the maximum straight line distance between the proximal point and distal point, exerts a residual tensile force on the adjustable seat basket between the proximal point and distal point such that the basket surface remains slightly curved.

11. The invention of claim 1 having darts in the resilient material between the basket surface and the first extending surface and second extending surface.

12. The invention of claim 11 wherein the basket surface and the living hinge are more easily bendable than the resilient material between the basket surface and the first extending surface and second extending surface.

13. The invention of claim 1 wherein the interior angles between the basket surface and the first extending surface and between the basket surface and the second extending surface are each between 90 degrees and 135 degrees.

14. The invention of claim 13 wherein the length and interior angle relative to the basket surface of the first extending surface and second extending surface are similar.

15. The invention of claim 14 wherein the adjustable seat basket is generally trapezoidal, the basket surface being at the top of the trapezoid, when viewed from the side in a the flat position.

16. The invention of claim 1 wherein the adjustable seat basket has an adjustment mechanism having a seat back connector for attaching the adjustment mechanism to the seat back and attached to the adjustable seat basket at a distal point near the second edge of the basket surface or the second extending surface and the adjustment mechanism is operable to releasably shorten the straight line distance between the seat back connector and the distal point.

17. The adjustable seat basket mountable on a seat back of claim 1 wherein said adjacency between said second end of said first extending surface and said first edge of said basket surface is substantially rigid.

18. An adjustable seat basket adapted to mount on a seat back comprising:

(a) a mounting tab;

(b) a hinge adjacent to said mounting tab;

(c) a first extending surface having a first end and a second end, said first end adjacent to said hinge and said second end being adapted to extend away from the seat back, said first extending surface forming an angle substantially between 90° and 135° to said mounting tab;

(d) a basket surface having a first edge and a second edge, said first edge adjacent to said second end of said first extending surface; and, (e) a second extending surface having a first side and a second side, said first side adjacent said second edge of said basket surface and said second side being adapted to extending towards the seat back, wherein said adjustable seat basket is a unitary construction of a resilient material and said hinge is a living hinge.

19. The adjustable seat basket mountable on a seat back of claim 18 wherein there are darts where said first edge of said basket surface is adjacent to said second end of said first extending surface.

20. An adjustable seat basket adapted to mount on a seat back comprising:

(a) a mounting tab;

(b) a hinge adjacent to said mounting tab;

(c) a first extending surface having a first end and a second end, said first end adjacent to said hinge and said second end being adapted to extend away from the seat back;

(d) said hinge being disposed to mediate travel of said first extending surface from an angle that is acute to said mounting tab, through an angle that is perpendicular to said mounting tab and to an angle that is obtuse to said mounting tab;

(e) a basket surface having a first edge, and a second edge, said first edge adjacent to said second end of said first extending surface; and (f) a second extending surface having a first side and a second side, said first side adjacent said second edge of said basket surface and said second side being adapted to extend towards the seat back;

wherein said adjustable seat basket is unitary construction of a resilient material and said hinge is a living hinge.

* * * * *

UNITED STATES PATENT AND TRADEMARK OFFICE
CERTIFICATE OF CORRECTION

PATENT NO. : 6,637,817 B1
DATED : October 28, 2003
INVENTOR(S) : Costentino et al.

It is certified that error appears in the above-identified patent and that said Letters Patent is hereby corrected as shown below:

<u>Title page,</u>
Item [75], Inventor, the first named inventor should be listed as -- Christopher Costentino --.

Signed and Sealed this

Twenty-seventh Day of January, 2004

JON W. DUDAS
*Acting Director of the United States Patent and Trademark Office*

UNITED STATES PATENT AND TRADEMARK OFFICE
CERTIFICATE OF CORRECTION

PATENT NO.    : 6,637,817 B1
DATED         : October 28, 2003
INVENTOR(S)   : Christopher et al.

It is certified that error appears in the above-identified patent and that said Letters Patent is hereby corrected as shown below:

<u>Column 6,</u>
Line 26, should read as follows -- ….adapted to extend towards the seat back; --

<u>Column 7,</u>
Lines 12 and 13, should read as follows -- …..the top of the trapezoid, when viewed from the side in a flat position. --

Signed and Sealed this

Ninth Day of March, 2004

JON W. DUDAS
*Acting Director of the United States Patent and Trademark Office*